United States Patent [19]
Yanase et al.

[11] 4,378,986
[45] Apr. 5, 1983

[54] METHOD OF MANUFACTURING OPTICAL FIBERS

[75] Inventors: Tomoo Yanase; Motohiro Arai, both of Tokyo, Japan

[73] Assignee: Nippon Electric Co., Ltd., Tokyo, Japan

[21] Appl. No.: 279,093

[22] Filed: Jun. 30, 1981

[30] Foreign Application Priority Data

Jul. 1, 1980 [JP] Japan .................................. 55-89813

[51] Int. Cl.³ ...................... C03B 19/06; C03B 37/025
[52] U.S. Cl. ........................................ 65/3.12; 65/3.2; 65/18.2; 65/32
[58] Field of Search ...................... 65/3.11, 3.12, 3.2, 65/18.1, 18.2, 32

[56] References Cited
U.S. PATENT DOCUMENTS 3,826,560  7/1974  Schultz ........................... 65/18.2 X
3,868,170  2/1975  DeLuca ........................... 65/3.12 X
4,062,665  12/1977 Izawa et al. ........................ 65/3.12
4,157,906  6/1979  Bailey .............................. 65/3.12
4,230,472  10/1980 Schultz ............................. 65/3.12
4,249,925  2/1981  Kawashima et al. ................ 65/3.12

FOREIGN PATENT DOCUMENTS 53-13932  2/1978  Japan .................................. 65/18.2

Primary Examiner—Richard V. Fisher
Attorney, Agent, or Firm—Sughrue, Mion, Zinn, Macpeak & Seas

[57] ABSTRACT

A method of manufacturing optical fibers by applying to a substantially cylindrical thin glass member layers of porous glass having a radially varying composition by means of pulverized glass generators. The porous glass layers are heated and defoamed to form a transparent glass preform containing the thin glass member which preform is heated and drawn to reduce the cross-sectional area to form an optical fiber.

19 Claims, 2 Drawing Figures

METHOD OF MANUFACTURING OPTICAL FIBERS

BACKGROUND OF THE INVENTION

The present invention relates to a method of manufacturing optical fibers for use in optical communication.

Optical fiber communications are coming into practical use because of reduced transmission losses of optical fibers, improved performance of optical semiconductor elements and progress in other peripheral techniques. The following four methods have been mainly used so far for the production of optical fibers for such optical communications. A first method of manufacturing optical fibers is, as disclosed in Japanese Patent laid-open No. 48-73522 dated Oct. 4, 1973, to cut out of a glass ball a cylindrical body of glass which will serve as the core, to cover the cylindrical body with a glass tube which will serve as the glass clad, and then to hot-draw the cladded structure into an optical fiber. A second method is, as disclosed in Japanese Patent laid-open No. 46-5788 dated Dec. 3, 1971, to form a core glass film on the inner wall of a glass tube, and then to heat and draw the tube thereby to produce an optical fiber having a cross section dense at its very center. A third method is, as disclosed in Japanese Patent laid-open No. 49-10055 dated Jan. 21, 1974 (corresponding to U.S. Pat. No. 3,826,560), to use a mandrel as the starting member, to spray finely pulverized glass around the mandrel, to remove the mandrel, to melt the remaining glass tube by heating to collapse the hollow at its center and to turn it into transparent glass, which is then hot-drawn into an optical fiber. A fourth method is, as disclosed in Japanese laid-open No. 52-121341 dated Oct. 12, 1977 (Japanese patent application No. 51-38883 corresponding to U.S. Pat. No. 4,062,665), to pile up porous glass bodies, which will serve as the core, in an axial direction, then to pile up thereon porous cladding material which will serve as the clad, to melt the cladded core by heating into a transparent glass rod and to hot-draw the rod into an optical fiber.

The first method, wherein the cylindrical core is cut out of a lump of glass and polished, is able to give only optical fibers whose refractive index profile is stepwise but not light focusing fibers having wide-band transmission characteristics. The second method, though a very simple one for the production of low-loss optical fibers, requires a long time to form the glass film and therefore is unsuitable for the manufacturing of optical fibers in large quantities. The third method, wherein pulverized glass is accumulated on a mandrel, is able to produce a large quantity of glass at a time and accordingly is suitable for the mass production of glass fibers. However, when the mandrel used as the starting member is drawn out of the porous glass body, the latter is readily damaged, and therefore this method is unsatisfactory in yield. The fourth method, wherein pulverized glass is accumulated as in the third, is suitable for the mass production of glass fibers. However, since in this method flowing pulverized glass determines the pattern of refractive index profile, the index profile is susceptible to air disturbances, and therefore the method is unsuitable for the steady production of optical fibers having wide-band transmission characteristics and a light-focusing type refractive index profile.

SUMMARY OF THE INVENTION

Accordingly, an object of the present invention is to provide a method of manufacturing, in large quantities with a steady and high yield, low-loss optical fibers having wide-band transmission characteristics.

A method of manufacturing optical fibers, according to the invention, comprises the steps of:

forming around a thin glass member first porous glass layers which, together with the thin glass member, are to constitute the core section;

forming around the first porous glass layers second porous glass layers which are to constitute the clad section;

heating and defoaming the first and second porous glass layers for turning into a transparent glass preform;

heating the transparent preform so formed to the drawing temperature; and drawing the heated transparent preform to reduce the cross-sectional area thereof to form an optical fiber.

According to the specific feature of the present invention, a thin glass member as a starting member may be a high-purity glass strand of a diameter ranging from 100 micrometers to 1 millimeter.

Other advantages and features of the invention will be more apparent from the detailed description hereunder taken in conjunction with the accompanying drawings.

DESCRIPTION OF THE PREFERRED EMBODIMENTS

Figure 1:
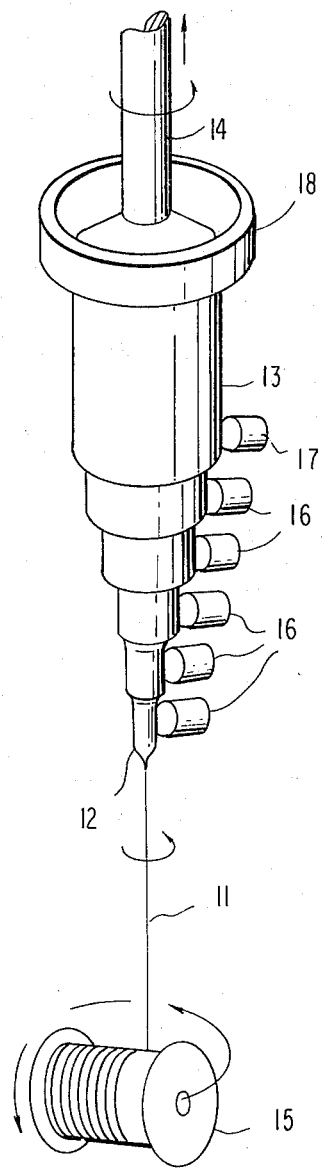
FIG. 1 is a perspective view of a manufacturing apparatus for use in a first embodiment of the invention.

Referring to FIG. 1, a thin glass member or cylindrical glass strand 11 which is the starting member is slowly discharged from a cylindrical drum 15. The discharged glass member 11 vertically rises and is slowly drawn up while rotating around its central axis; pulverized glass to form the core, emitted from a plurality of pulverized glass generators 16, is accumulated around the glass member 11, and pulverized glass to form the clad, emitted from another pulverized glass generator 17, is further accumulated thereon, so that a porous glass body 13 having the glass member 11 at its center is formed. The pulverized glass to form the core, emitted from the plurality of pulverized glass generators 16, slightly differs in ingredient ratio from one generator to the next, and this ratio is so controlled stepwise as to bring the refractive index profile of the porous glass body 13 as close as practicable to its optimum pattern for light focusing performance. If the plural pulverized glass generators 16 are arranged at such intervals (for instance at 30-millimeter intervals) that the adjacent pulverized glass discharges interfere with each other, there can be obtained optical fibers having a focusing-type refractive index profile which varies smoothly. The porous glass body 13 having the glass member 11 at its center is led, while rotating, into a carbon resistance furnace 18, and heated and defoamed therein to give a transparent glass preform 14. The transparent glass preform 14 thereby obtained is further heated and drawn into an optical fiber.

In this embodiment of the invention, where glass materials are prepared by accumulating pulverized, instead of transparent, glass, it is possible to process a large quantity of glass and thereby to mass-produce optical fibers. Further in this embodiment, where the refractive index profile can be caused to take a focusing pattern and the refractive index distribution of the core section can be controlled by varying the ingredient ratio of the pulverized glass emitted from the plurality of pulverized glass generators 16, the refractive index profile can be well controlled and, therefore, wide-band optical fibers can be produced in a stable manner. Further, the use of high-purity glass fibers of uniform refractive index and quality as the starting glass member 11, allows the production of low-loss optical fibers, moreover in a high yield because the starting member need not be removed. The desired lengths of rod-shaped transparent glass preform can be consecutively produced because the glass member 11, as the starting member, can be supplied by winding needed lengths on the cylindrical drum. This feature makes this method particularly suitable for the manufacture of optical fibers in large quantities.

This embodiment will be described in further detail hereunder. The glass member 11 used as the starting member in this specific embodiment measures 500 microns in outer diameter, has a refractive index of 1.463 and is made of $SiO_2$-$P_2O_5$-$GeO_2$ glass. This glass member can be readily produced by hot-drawing a cylindrical glass rod manufactured by the method described in the U.S. Pat. No. 2,326,059, incorporated herein by reference. This glass member 11 used as the starting member, because of its thinness (500 microns in outer diameter) is highly flexible, and a 100 meter length of it can be wound on a cylindrical drum having a diameter of 30 centimeters. The starting member, while revolving at a rate of 10 revolutions per minute, was unwound from the drum at a speed of 5 millimeters per minute. Five pulverized glass generators 16 for the core were prepared, together with one pulverized glass generator 17 for the clad. The flow rates of the gases emitted from each of the burners 16, 17 are listed in Table 1. Fuel gas, oxygen, argon and pulverized glass-producing materials were supplied by the glass generator in the amounts shown in Table 1. The burning of the fuel gas causes production of fine glass particles from the entrained glass-producing material which is applied to the glass rod or previously deposited glass. Pulverized glass generators are described, for example, in U.S. Pat. No. 4,062,665 (particularly FIG. 2C). The porous glass body 13 formed by the accumulation of pulverized glass around the thin glass member had a diameter of about 70 millimeters. The porous glass body was introduced into a carbon resistance furnace 18 measuring 90 millimeters in inner diameter and 30 millimeters in height, at a temperature of 1,650° C., and in an atmosphere of helium gas, wherein the glass body was defoamed into transparent glass preform 14. The transparent glass preform 14 was cut off when its length reached 80 centimeters, and heated and drawn in a carbon heater furnace for spinning use at a temperature of 2,050° C.

TABLE 1

| Order (from bottom in FIG. 1) | | SiCl4 (gr/min) | GeCl4 (g/min) | POCl3 (g/min) | Hydrogen Gas (cc/min) | Oxygen Gas (cc/min) | Argon Gas (cc/min) |
|---|---|---|---|---|---|---|---|
| For Core | No. 1 | 0.80 | 0.080 | 0.013 | 2500 | 5000 | 1200 |
| | No. 2 | 0.80 | 0.064 | 0.013 | 2500 | 5000 | 1150 |
| | No. 3 | 0.80 | 0.048 | 0.013 | 2500 | 5000 | 1100 |
| | No. 4 | 0.80 | 0.032 | 0.013 | 2500 | 5000 | 1050 |
| | No. 5 | 0.80 | 0.016 | 0.013 | 2500 | 5000 | 1000 |
| For Clad | — | 1.60 | 0.000 | 0.026 | 4000 | 6000 | 2000 |

This resulted in an optical fiber measuring 125 microns in outer diameter, 80 microns in core diameter and 32 kilometers in length. The numerical aperture of this optical fiber was 0.21, its transmission at a wavelength of 0.85 microns was as low as 3.0 decibels/kilometer, and its bandwidth at that wavelength was 500 Megaherz kilometers, which is sufficient.

Although the glass rod 11 used in this embodiment as the starting member had an outer diameter of 500 microns such member can be as thick as 1 millimeter in outer diameter and still thin enough to be wound on a cylindrical drum, or it can be as thin as 100 microns because it need not be thicker than enough to hold the porous glass body. Thus, in this embodiment, its acceptable outer diameter ranges from 100 microns to 1 millimeter. The starting member 11 used in this embodiment was made of $SiO_2$-$P_2O_5$-$GeO_2$ glass of such an ingredient ratio to give a refractive index of 1.463; but the starting member need not be limited to this material. It may be of glass of some other composition so long as its refractive index is substantially equal to that of the core center of the optical fiber to be produced.

Although five units of the pulverized glass generators 16 for core formation were used in this embodiment, there obviously is no reason to limit their number.

In this embodiment, the step of producing the transparent glass preform 14 was separate from the hot-drawing process to obtain an optical fiber, but they can evidently be made continuous by adding a spinning furnace.

Figure 2:
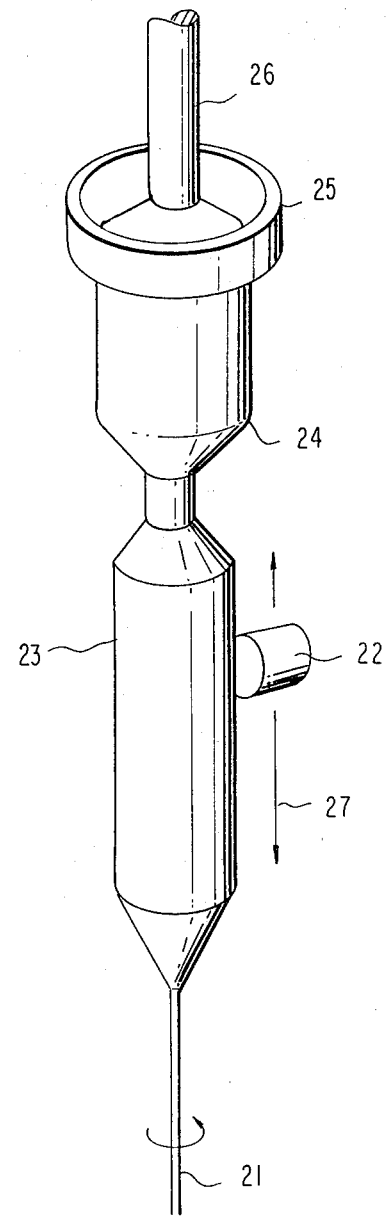
FIG. 2 is a perspective view of a manufacturing apparatus for use in a second embodiment thereof.

Next will be described a second embodiment of the present invention with reference to FIG. 2. A thin glass member 21, the starting member, is rotated around its central axis. Pulverized glass emitted from a pulverized glass generator 22, which vertically reciprocates within the range indicated by arrows 27, is accumulated on the peripheral surface of the glass rod member 21 to form a porous glass body 23. During the process of pulverized glass accumulation, the thin glass rod 21 rotates but remains still in its axial direction. The porous glass body 23 formed by the accumulation of pulverized glass has as many layers as the reciprocating motions of glass generator 22, and the ingredient ratio of each layer can be so varied by controlling the feed to the glass generator 22 that the subsequently formed transparent glass preform can have a light focusing type refractive index profile. When the prescribed number of layers have been formed, the emission of pulverized glass is discontinued, and the porous glass body 23 is slowly introduced into a carbon resistance furnace 25 positioned above, in which it is defoamed by heating to give a transparent glass preform 26. The transparent glass preform 26 so obtained is cut off, and then hot-drawn into an optical fiber.

In the second embodiment, as the first, since glass materials are prepared by accumulating pulverized, instead of transparent, glass, it is also possible to process a large quantity of glass and thereby to mass-produce optical fibers. In this embodiment it is possible to produce optical fibers having a refractive index distribution substantially close to any desired pattern, and accordingly to manufacture light focusing type optical fibers capable of wide-band transmission. Since the refractive index profile in the core section is controlled by forming a multilayer film so as to achieve a refractive index profile substantially close to a light focusing pattern, the profile is well controlled, and accordingly wide-band optical fibers can be readily manufactured by this method. The use of high-purity glass fibers of uniform quality as the starting member achieves the production of low-loss optical fibers, moreover in a high yield because the starting member need not be removed.

This embodiment will be described in further detail hereunder. The glass member 21 used as the starting member was of the same kind as that used in the first embodiment. While this starting member was revolved at a rate of 30 revolutions per minute, an 80-layer porous glass film was formed on its surface by the pulverized glass generator 22. Out of these 80 layers, the first 60, consisting of $SiCl_4$, $GeCl_4$ and $POCl_3$ mixed in hydrogen, oxygen and argon gases, constituted the core glass, while the last 20, comprising $SiCl_4$ and $POCl_3$ also mixed in hydrogen, oxygen and argon gases, formed the clad glass. After all the 80 layers of pulverized glass around the thin glass rod 21 were accumulated to form the porous glass body 23, the diameter of the porous glass body 23 was about 60 millimeters. Following the completion of the accumulation step, the porous glass body 23 was defoamed by heating in the same carbon resistance furnace used in the first embodiment to give a transparent glass rod having an outer diameter of 25 millimeters. The temperature in the carbon resistance furnace for defoaming was 1650° C., and the defoaming was achieved in a helium gas atmosphere. The transparent glass rod, measuring about 20 centimeters in length, was heated and drawn in a carbon heater furnace at a temperature of 2050° C. into an optical fiber measuring 125 microns in outer diameter, 80 microns in core diameter and 8 kilometers in length and having a light focusing type refractive index distribution. This optical fiber had transmission characteristics similar to those provided by the first embodiment.

In the second embodiment, when pulverized glass was accumulated, the pulverized glass generator 22 was caused to vertically reciprocate while the starting member remained still in the vertical direction; it will be recognized that the pulverized glass generator 22 can be fixed if the starting member is caused to vertically reciprocate instead.

While, in the above two embodiments, the pulverized glass composition to constitute the core area is gradually changed, it is apparent that the composition can be kept uniform to produce a step index type optical fiber.

What is claimed is:

1. A method of manufacturing an optical fiber having core and clad sections, comprising the steps of:
    forming around a thin glass member first porous glass layers which, together with said thin glass member, are to constitute a core section of said optical fiber;
    forming around said first porous glass layers second porous glass layers which are to constitute a clad section of said optical fiber;
    heating and defoaming said first and second porous glass layers to produce a transparent glass preform;
    heating said transparent preform so formed to a drawing temperature thereof; and
    drawing the heated transparent preform to reduce the cross-sectional area of said thin glass member and said first porous glass layers to form a core section of said optical fiber, the reduced cross-sectional area of said thin glass member constituting a part of said core section, the reduced cross-sectional area of said first porous glass layers constituting the remainder of said core section.

2. A method of manufacturing an optical fiber, comprising the steps of:
    providing a substantially cylindrical thin glass member;
    rotating said glass member about a longitudinal axis thereof;
    applying pulverized glass materials to said glass member to form porous glass layers thereon;
    heating and defoaming said porous glass layers to from a transparent glass preform;
    heating said transparent preform to a drawing temperature thereof; and
    drawing the heated transparent preform to reduce the cross-sectional area of said thin glass member and said porous glass layers to form a core section of an optical fiber, the reduced cross-sectional area of said thin glass member constituting a part of said core section, the reduced cross-sectional area of said porous glass layers constituting the remainder of said core section.

3. The method of claim 2, wherein said pulverized materials are applied to said glass member in layers to form said porous glass layers, a composition of first porous glass layers being suitable to constitute a core section of said optical fiber and a composition of second porous glass layers being suitable to form a clad section of said optical fiber.

4. The method of claim 3, further comprising the step of transporting said glass member vertically at a predetermined speed.

5. The method of claim 4, wherein said first porous glass layers are formed by spraying onto said thin glass member fine glass particles from a plurality of pulverized glass generators arranged at predetermined intervals in the vertical direction relative to said thin glass member.

6. The method of claim 5, wherein said pulverized glass generators disposed in the lower vertical position relative to said thin glass member supply refractive index materials suitable for core-forming material.

7. The method of claim 3, wherein said first porous glass layers are formed by using a single pulverized glass generator.

8. The method of claim 7, wherein said pulverized glass generator reciprocates in the vertical direction.

9. The method of claim 3, wherein said first porous glass layers have radially varying composition.

10. The method of claim 3, wherein said first porous glass layers are of composition such that a radially varying index of refraction is provided when said optical fiber is produced.

11. The method of claim 2, wherein said glass member is a glass fiber.

12. The method of claim 10, wherein said glass fiber has a uniform index of refraction.

13. The method of claim 2, wherein said glass member has a diameter ranging from 100 microns to 1 millimeter.

14. A method of manufacturing an optical glass fiber, comprising the steps of:

providing a substantially cylindrical thin glass member having a diameter between 100 microns and 1 millimeter;
rotating and moving said glass member in a vertical direction past a series of vertically disposed pulverized glass generators;
applying to said thin glass member, as it moves past said pulverized glass generators, a series of layers of pulverized glass to form a plurality of radial layers of porous glass on said thin glass member;
defoaming the thin glass member having thereon said plurality of layers of porous glass to form a transparent glass preform;
heating and drawing said transparent glass preform to reduce the cross-sectional area of said thin glass member and the radially innermost of said porous glass layers to form a core section of said optical glass fiber, the reduced cross-sectional area of said thin glass member constituting only a small part of said core section, said radially innermost porous glass layers constituting the remainder of said core section.

15. A method of manufacturing an optical glass fiber, comprising the steps of:
providing a substantially cylindrical thin glass member;
rotating said glass member;
vertically moving a pulverized glass generator relative to said glass member to apply thereto a plurality of radial layers of porous glass;
defoaming the thin glass member having thereon said plurality of layers of porous glass to form a transparent glass preform;
heating and drawing said transparent glass preform to reduce a cross-sectional area of said thin glass member and the radially innermost of said porous glass layers to form the core section of an optical glass fiber, the reduced cross-sectional area of said thin glass member constituting only a small part of said core section, said radially innermost porous glass layers constituting the remainder of said core section.

16. The method of claim 14 or 15, wherein the layers of porous glass vary in composition.

17. The method of claim 16, wherein the composition of the radially innermost of the porous glass layers is suitable to form a core layer upon said defoaming, heating and drawing and the outermost layers are of composition suitable to form a clad layer upon said defoaming, heating and drawing.

18. The method of claim 14 or 15, wherein said glass member is a $SiO_2$-$P_2O_5$-$GeO_2$ glass.

19. The method of claim 14 or 15, wherein said defoaming is accomplished by heating said glass member having thereon said plurality of layers of porous glass under a helium atmosphere.

* * * * *